United States Patent [19]
Konishi et al.

[11] 3,951,941
[45] Apr. 20, 1976

[54] TRISAZO COMPOUNDS CONTAINING A DIPHENYL-TETRAZINYL COMPONENT

[75] Inventors: Kenzo Konishi, Nishinomiya; Akira Kotone, Nara; Yoshihiko Nakane, Yao; Takeshi Hori; Masahiro Hoda, both of Sakai, all of Japan

[73] Assignee: Sakai Chemical Industry Company, Limited, Osaka, Japan

[22] Filed: Mar. 13, 1974

[21] Appl. No.: 450,816

[30] Foreign Application Priority Data
Mar. 14, 1973 Japan.................. 48-29835

[52] U.S. Cl................. 260/152; 260/241; 424/244
[51] Int. Cl.².............. C09B 35/34; D06P 3/04; D06P 3/24; D06P 3/60
[58] Field of Search............ 260/152, 154, 153, 166, 260/168, 170

[56] References Cited
UNITED STATES PATENTS

| | | | |
|---|---|---|---|
| 482,106 | 9/1892 | Ulrich et al............. | 260/170 |
| 2,195,786 | 4/1940 | Schmid................. | 260/153 |
| 2,842,538 | 7/1958 | Byland................. | 260/168 |
| 2,871,230 | 1/1959 | Huss et al............. | 260/144 |
| 2,941,991 | 6/1960 | Byland................. | 260/145 |

FOREIGN PATENTS OR APPLICATIONS

| 331,480 | 9/1958 | Switzerland........... | 260/171 |
|---|---|---|---|

*Primary Examiner*—Floyd D. Higel
*Assistant Examiner*—John J. Doll
*Attorney, Agent, or Firm*—Armstrong, Nikaido & Wegner

[57] ABSTRACT

A polyazo dye represented by the formula

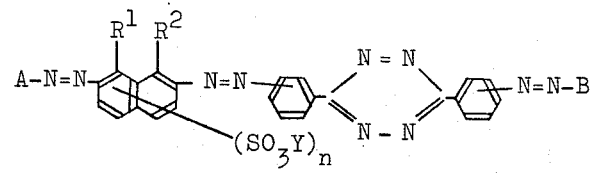

wherein A is an aromatic ring having or not having a substituent, B is an aromatic ring having at least one substituent selected from the group consisting of amino, substituted amino and hydroxyl, Y is hydrogen, alkali metal, $-NH_4$ or an amine salt residue, $n$ is 1 or 2, and each of $R^1$ and $R^2$ is hydroxyl or amino, $R^1$ being amino when $R^2$ is hydroxyl and hydroxyl when $R^2$ is amino. The polyazo dye has outstanding utility in the dyeing of fibers having hydroxyl and/or amide groups and are not carcinogenic.

3 Claims, No Drawings

TRISAZO COMPOUNDS CONTAINING A DIPHENYL-TETRAZINYL COMPONENT

This invention relates to novel polyazo dyes and processes for producing the same, more particularly to dyes capable of dyeing fibrous materials made of cotton, silk, wool and like fibers having hydroxyl and/or amide groups and processes for preparing the same.

Generally, polyazo dyes basically prepared from benzidine or its derivatives are well-known as dyes for fibrous materials made of fibers having hydroxyl and/or amide groups. These dyes are excellent in color, dyeability, solubility in water and chemical stability. Moreover, they assure excellent dischargeability on silk or the like. Because of these advantages, the polyazo dyes have long been used in a wide variety of applications. However, recent researches have revealed that benzidine and the derivatives thereof affect the living body medically. In fact these compounds are found to be very likely to cause cancer especially in the bladder when introduced into the living body. For this reason, it has been strongly desired to provide dyes which are free of any hazard of causing cancer and serviceable as substitutes for polyazo dyes of the benzidine type and which are equivalent or superior to the conventional polyazo dyes with respect to dyeability and above-mentioned characteristics.

A main object of this invention is to provide novel and useful dyes which fulfill the above requirements and processes for preparing the same.

Other objects and advantages of this invention will be apparent from the following description.

The present invention provides novel polyazo dyes represented by the formula

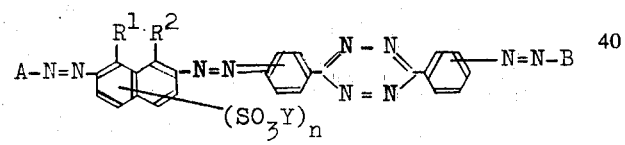

(I)

wherein A is an aromatic ring having or not having a substituent, B is an aromatic ring having at least one substituent selected from the group consisting of an amino group, substituted amino group and hydroxyl group, Y is a hydrogen atom, alkali metal, —NH$_4$ group or amine salt residue, n is 1 or 2, and each of R$^1$ and R$^2$ is a hydroxyl group or amino group, R$^1$ being an amino group when R$^2$ is a hydroxyl group, or a hydroxyl group when R$^2$ is an amino group.

The present invention has been accomplished based on the novel finding that the new compounds of the formula (I) give very excellent colors and that they are almost as excellent as the conventional polyazo dyes of benzidine-type in dyeability, solubility in water and chemical stability but have no carcinogenic property and are very low in toxic properties.

Preferable examples of novel polyazo dyes represented by the foregoing formula (I) are those wherein A is a phenyl group, naphthyl group or phenyl or naphthyl group having at least one substituent of a halogen atom, lower alkyl group, lower alkoxy group, amino group, carboxyl group, nitro group and sulfonic acid group; those wherein B is

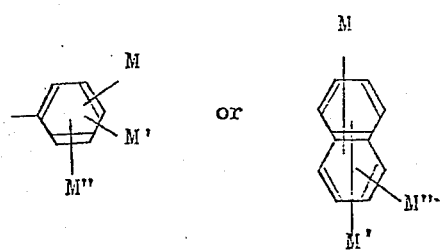

M being NH$_2$ or OH, and
M' and M'' being the same or different and being H, NO$_2$, lower alkyl, SO$_3$H, or N(R$^6$)$_2$, the members R$^6$ being the same or different and being H, lower alkyl or phenyl substituted with lower alkyl; those wherein R$^1$ is a hydroxyl group, R$^2$ is an amino group and Y is a hydrogen or sodium atom. The most preferable examples of novel polyazo dyes represented by the foregoing formula (I) are those wherein A is

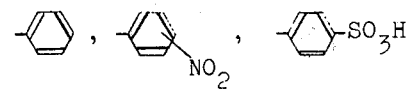

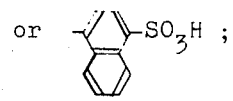

those wherein B is

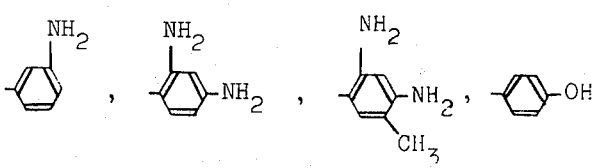

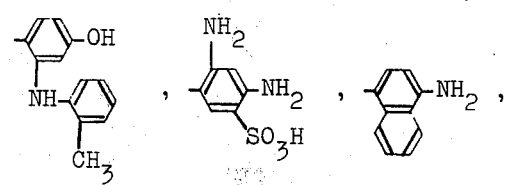

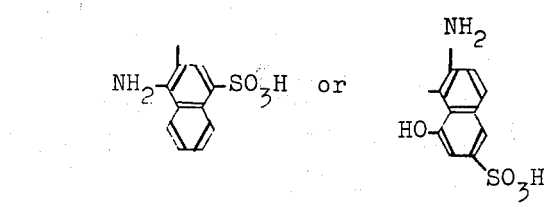

Listed in Table 1 below are typical examples of novel polyazo dyes of this invention represented by the formula (I). These compounds are indicated by giving examples of A, $R^1$, $R^2$, Y, $n$, X and B in the formula of

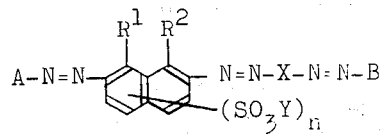

Table 1

| No. | A— | $R^1$ | $R^2$ | Y | —X— | —B | Color |
|---|---|---|---|---|---|---|---|
| 1 | phenyl | OH | $NH_2$ | " | tetrazine bridge | diamino phenyl | bluish black |
| 2 | $O_2N$-phenyl | " | " | " | " | " | black |
| 3 | phenyl | " | " | " | " | diamino methylphenyl | bluish black |
| 4 | $HO_3S$-naphthyl | OH | $NH_2$ | Na | tetrazine bridge | diamino methylphenyl | bluish black |
| 5 | " | " | " | " | " | hydroxy-NH-methylphenyl | " |
| 6 | $O_2N$-phenyl | " | " | " | " | diamino methylphenyl | bluish black |
| 7 | phenyl | " | " | " | " | hydroxyphenyl | green |
| 8 | $HO_3S$-phenyl | " | " | " | " | hydroxy-NH-methylphenyl | bluish green |

Table 1-continued

| No. | A— | R¹ | R² | Y | —X— | —B | Color |
|---|---|---|---|---|---|---|---|
| 9 | HO₃S–⌬– | OH | NH₂ | Na | ⌬–C(=N-N=)–C(=N-N)–⌬ (tetrazine bridge) | 2,4-diaminophenyl (H₂N, NH₂) | bluish black |
| 10 | –⌬ | NH₂ | OH | " | " | " | black |
| 11 | " | OH | NH₂ | " | CH₃-⌬–C(=N-N=)–C(=N-N)–⌬-CH₃ | " | greenish black |
| 12 | O₂N–⌬– | " | " | " | " | 2,4-diaminophenyl (NH₂, NH₂) | greenish black |
| 13 | –⌬ | " | " | " | " | 2,4-diamino-5-methylphenyl (NH₂, NH₂, CH₃) | " |
| 14 | O₂N–⌬– | OH | NH₂ | Na | CH₃-⌬–C(=N-N=)–C(=N-N)–⌬-CH₃ | 2,4-diamino-5-methylphenyl (H₂N, NH₂, CH₃) | greenish black |
| 15 | –⌬ | " | " | " | " | –⌬–OH | green |
| 16 | HO₃S–⌬– | " | " | " | " | –NH–⌬–OH with CH₃ | reddish black |
| 17 | " | " | " | " | " | 2,4-diaminophenyl (NH₂, NH₂) | " |
| 18 | HO₃S–naphthyl | " | " | " | " | 2,4-diaminophenyl (H₂N, NH₂) | reddish black |

Table 1-continued

| No. | A— | R¹ | R² | Y | —X— | —B | Color |
|---|---|---|---|---|---|---|---|
| 19 |  | NH₂ | OH | Na | 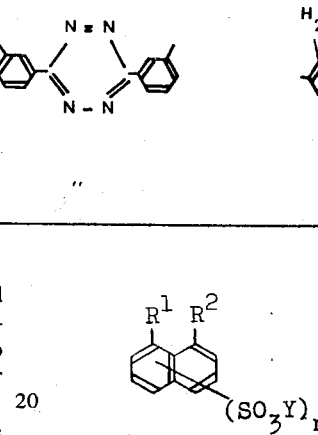 | 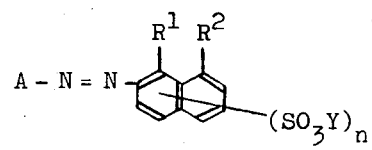 | black |
| 20 | O₂N-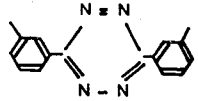 | ″ | ″ | ″ | ″ | ″ | ″ |

The novel polyazo dyes of this invention represented by the formula (I) do not contain benzidine or its derivatives as the basic component and therefore have no carcinogenic property and are extremely low in their toxicity.

The fact that the starting diamino-diphenyl tetrazine having the formula of

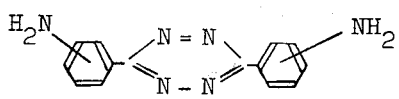

exhibit no carcinogenic property can be seen from the following test.

Carcinogenic property 3,3'-diamino-diphenyl tetrazine was orally administered to female rats of 40 days of age once every 3 days. After 9 months' continuous administration, the animals were killed. The internal organs thereof were weighed and made into specimens of tissues to determine carcinogenic property. The results showed that no carcinoma was observed at a dose of 25 times as much as the amount of benzidine at which the latter gave 50% carcinoma.

The novel polyazo dyes are as excellent as the conventional dyes basically prepared from benzidine or its derivatives with respect to dyeability and chemical stability and are almost equivalent to the known dyes in giving excellent colors. The present novel dyes are readily soluble in water and effectively dye fibrous materials of hydroxyl- and/or amide-containing fibers. The dyeings obtained not only exhibit excellent colors equivalent to those given by the conventional polyazo dyes of benzidine type but also have good fastness to light, washing, acid and alkali.

The novel polyazo dyes of this invention can be produced by various processes as exemplified below.

Process 1

A process comprising the steps of coupling, in a desired sequence, a tetrazotized product of diamino-diphenyl tetrazine represented by the formula

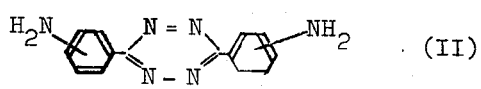  (II)

with an aminonaphtholsulfonic acid represented by the formula

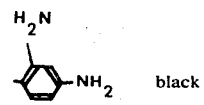 (III)

wherein R¹, R², n and Y are the same as defined before and with an aromatic compound represented by the formula

B — H     (IV)

wherein B is the same as defined before, and coupling the resulting disazo dye with a diazotized product of aromatic amine represented by the formula

A — NH₂     (V)

wherein A is the same as defined before.

Process 2

A process comprising the steps of coupling a tetrazotized product of diamino-diphenyl tetrazine of the formula (II) with an aminonaphtholsulfonic acid of the formual (III), coupling the resulting product with a diazotized product of aromatic amine of the formula (V), and coupling the product obtained with an aromatic compound of the formula (IV).

Process 3

A process comprising the steps of coupling an aminonaphtholsulfonic acid of the formula (III) with a diazotized product of aromatic amine of the formula (V) to prepare a compound of the formula

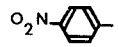

wherein A, R¹, R², Y and n are the same as defined before, coupling the compound with a tetrazotized product of diamino-diphenyl tetrazine of the formula (II), and coupling the resulting product with an aromatic compound of the formula (IV).

The novel dye of this invention can be prepared by any of the processes described above. However, if R¹ of the compound represented by the formula (III) is OH (i.e.

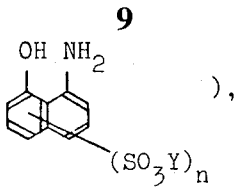

the processes 1 and 2 are preferable, whereas if $R^1$ is $NH_2$ (i.e.

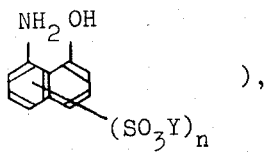

the process 3 is desirable.

Examples of the diamino-diphenyl tetrazine of the formula

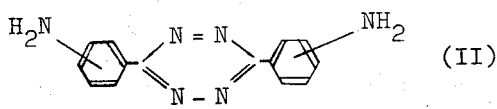

to be used in this invention are 3,3'-diamino-diphenyl tetrazine or 4,4'-diamino-diphenyl tetrazine.

Examples of the compound represented by the formula (III)

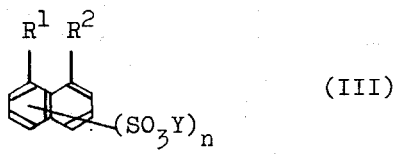

(wherein $R^1$, $R^2$ and Y are the same as defined before) to be used in this invention are 1-amino-8-naphthol-3,6-disulfonic acid, sodium 1-amino-8-naphthol-3,6-disulfonate, 1-amino-8-naphthol-3-sulfonic acid, 1-amino-8-naphthol-6-sulfonic acid, 1-naphthol-8-amino-3,6-disulfonic acid, sodium 1-naphthol-8-amino-3,6-disulfonate, etc.

The compound represented by the formula

wherein B is the same as defined before, usable as a material in this invention, includes aromatic amines, phenols or naphthols having or not having a substituent. Examples thereof are toluylenediamine, N,N-diethyl-N'-acetyl-m-phenylenediamine, aminonaphthalene, aminonaphthalene sulfonic acid, aminonaphthalene disulfonic acid, aminonaphthol sulfonic acid, aminonaphthol disulfonic acid, acetylaminonaphthol sulfonic acid, acetylaminonaphthol disulfonic acid, benzoylaminonaphthol sulfonic acid, benzoylaminonaphthol disulfonic acid, 1-chloro-8-naphthol-3,6-disulfonic acid, 3-aminophenol, N,N-di(o-toluyl)-m-aminophenol, 3-acetylaminophenol, 3-hydroxy-4-methyldiphenylamine, aniline, 3-aminotoluene, 1,3-phenylenediamine, 3-β-hydroxyethylaminoaniline, 2-methyl-1,3-phenylenediamine, 4-methyl-1,3-phenylenediamine, 3-acetylaminoaniline, 3-aminophenyl urea, 3-aminophenylglycine, 6-methyl-3-amino-phenylglycine, 1,3-phenylenediamine-4-sulfonic acid, 4-chloro-1,3-phenylenediamine, 4-nitro-1,3-phenylenediamine, 3-aminoanisole, 3-dimethylaminoaniline, 3-oxalylaminoaniline, 3-glyconylaminoaniline, 2,4-diamino-acetoanilide, naphthol, naphthol-sulfonic acid, naphthol-tri-sulfonic acid, phenol, cresol, chlorophenol, etc.

Examples of the aromatic amine of the formula (V)

$$A - NH_2 \qquad (V)$$

(wherein A is the same as defined before) to be used in this invention are aniline, methylaniline, ethylaniline, t-butylaniline, cyclohexylaniline, dimethylaniline, methoxyaniline, ethoxyaniline, nitroaniline, dinitroaniline, nitrochloroaniline, 2-aminodiphenylether, 4-aminodiphenylether, 2-amino-2'-methyldiphenylether, 4-amino-4'-methyldiphenylether, 2-amino-2'-chlorodiphenylether, 4-amino-4'-chlorodiphenylether, acetylaminoaniline, propionylaminoaniline, oxalylaminoaniline, aminophenylurea, benzoylaminoaniline, 3-chloro-benzoyl-aminoaniline, 4'-chlorobenzoylaminoaniline, 3'-methylbenzoylaminoaniline, 4'-methyl-benzoylaminoaniline, 3'-nitrobenzoylaminoaniline, 4'-nitrobenzoylaminoaniline, 4-benzoylethylaminoaniline, 2-methyl-4-acetylaminoaniline, 2-methyl-5-acetyl-aminoaniline, 2-methyl-4-benzoylaminoaniline, 2-methyl-5-benzoylaminoaniline, 2-methyl-4-formylaminoaniline, 4-methyl-3-formylaminoaniline, 2-methyl-5-oxalyl-aminoaniline, 4-methyl-3-oxalylaminoaniline, chloroaniline, methylchloroaniline, methylmethoxyaniline, methoxychloroaniline, dimethoxyaniline, methoxyacetylaniline, methoxyacetylaminoaniline, methoxyoxalylaminoaniline, 4-methylaniline-2-sulfonic acid, 4-methoxyaniline-2-sulfonic acid, 4-ethoxyaniline-2-sulfonic acid, 4-methylaniline-3-sulfonic acid, 4-methoxyaniline-3-sulfonic acid, aniline-2-sulfonic acid, 5-acetylaminoaniline-2-sulfonic acid, 4-chloroaniline-3-sulfonic acid, 4-acetylaminoaniline-2-sulfonic acid, 4-benzoylaminoaniline-2-sulfonic acid, 4-oxalylaminoaniline-3-sulfonic acid, aniline-3-sulfonic acid, aniline-4-sulfonic acid, aminobenzoic acid, anicidine, naphthionic acid etc. Among these especially preferable are aniline, 4-nitroaniline, aniline-4-sulfonic acid and naphthionic acid.

According to this invention the tetrazotization and diazotization in any of the foregoing processes can be effectively carried out exactly in conventional manners. For example, the starting diamino-diphenyl tetrazine having the formula of

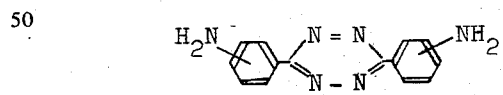

is reacted with a nitrite in the presence of a mineral acid such as sulfuric acid, hydrochloric acid, etc., at a low temperature, preferably at 0° to 10°C, to produce a tetrazotized product of the aromatic diamine. The diazotization of the aromatic amine having the formula of $A—NH_2$ (A is the same as defined before) can also be conducted under the same conditions as above.

Likewise, coupling can be effected in conventional manners. For example, the coupling is carried out at a temperature of lower than 25°C, preferably 0° to 5°C for 10 minutes to 24 hours. The pH of the reaction system may vary over a wide range and may be suitably selected in accordance with the kind of the reactants to be coupled. The sequence of reaction and pH of the reaction system in the above processes are illustrated as follows, in which
 AA shows aromatic amine of the formula (V),
 1-ANS shows 1-amino-8-naphtolsulfonic acid of the formula

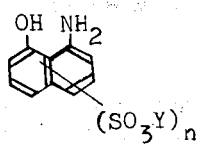

(Y and n are the same as defined before),
8-ANS shows 8-amino-1-naphtholsulfonic acid of the formula

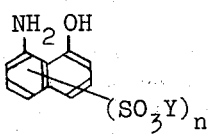

(Y and n are the same as defined before),
ADA shows diamino-diphenyl tetrazine of the formula (II), and
AC shows an aromatic compound of the formula (IV)

Process-1

$$AA \xrightarrow[\text{alkaline}]{3} 1\text{-}ANS \xrightarrow[\text{acidic}]{1} ADA \xrightarrow[\text{acidic or alkaline}]{2} AC,$$

$$AA \xrightarrow[\text{acidic}]{3} 8\text{-}ANS \xrightarrow[\text{alkaline}]{1} ADA \xrightarrow[\text{alkaline or acidic}]{2} AC,$$

$$AA \xrightarrow[\text{alkaline}]{3} 1\text{-}ANS \xrightarrow[\text{acidic}]{2} ADA \xrightarrow[\text{acidic or alkaline}]{1} AC,$$

$$AA \xrightarrow[\text{acidic}]{3} 8\text{-}ANS \xrightarrow[\text{alkaline}]{2} ADA \xrightarrow[\text{alkaline or acidic}]{1} AC$$

Process-2

$$AA \xrightarrow[\substack{\text{alkaline}\\ \text{or neutral}}]{2} 1\text{-}ANS \xrightarrow[\text{acidic}]{1} ADA \xrightarrow[\substack{\text{acidic}\\ \text{or alkaline}}]{3} AC,$$

$$AA \xrightarrow[\substack{\text{acidic or}\\ \text{neutral}}]{2} 8\text{-}ANS \xrightarrow[\text{alkaline}]{1} ADA \xrightarrow[\substack{\text{alkaline}\\ \text{or acidic}}]{3} AC$$

Process 3

$$AA \xrightarrow[\text{alkaline}]{1} 1\text{-}ANS \xrightarrow[\text{acidic}]{2} ADA \xrightarrow[\substack{\text{acidic or}\\ \text{alkaline}}]{3} AC,$$

$$AA \xrightarrow[\substack{\text{acidic}\\ \text{or neutral}}]{1} 8\text{-}ANS \xrightarrow[\text{alkaline}]{2} ADA \xrightarrow[\substack{\text{alkaline}\\ \text{or acidic}}]{3} AC$$

The novel polyazo dyes of this invention are used for dyeing fibrous materials made of fibers having hydroxyl and/or amide groups. Exemplary of the fibers containing hydroxyl groups are cotton, hemp, cellulose, viscose rayon, cuprammonium artificial silk, vinylon (polyvinyl alcohol fiber), etc. Further examples of fibers having amide groups are silk, wool, polyamide synthetic fiber (nylon), polyurethane synthetic fiber, etc. The fibrous materials of these fibers include various products using these fibers such as thread, woven fabrics, knitted fabrics, felts, nonwoven fabrics, paper, leathers, etc.

The fibrous materials made of fibers containing hydroxyl groups and/or amide groups can be dyed or printed with the novel polyazo dyes of this invention in the same manner as conventionally practiced with this type of polyazo dyes. For instance, to dye a fibrous material of cotton, it is suitable to employ a dyeing bath having a pH of 8 to 10 and containing 1 to 8% by weight of a dye and 5 to 40% by weight of an inorganic salt, based on the fibrous material to be dyed. The fibrous material is placed in the bath with a liquor ratio of 1:20 to 1:40. The bath is then gradually heated and maintained at a temperature approximate to the boiling point for 20 to 50 minutes for dyeing. When dyed, the fibrous material is taken out, roughly washed with water, squeezed and dried. Further fibrous materials of fibers having amide groups can be dyed within a wide pH range of from acidic to alkaline but, in general, they are preferably dyed in neutral to acidic pH range, most preferably at a pH of about 2 to 7. In the case where a fibrous material of wool is to be dyed, for example, it is preferable to use a dyeing bath having a pH of 2 to 7 and containing 3 to 10% by weight of a dye and 1 to 5% by weight of concentrated sulfuric acid or acetic acid, based on the fibrous material to be dyed. The fibrous material is placed in the bath at 60°C with a liquor ratio of 1:30 to 1:40. The bath is then heated gradually to the boiling point and maintained at this temperature for 30 to 90 minutes for dyeing. When dyed, the fibrous material is taken out, roughly washed with water, squeezed and dried. In the case where a fibrous material of silk is to be dyed, for example, it is preferable to employ a dyeing bath having a pH of 7 to 10 and containing 50 to 300% by weight of a dye and 0.5 to 20% by weight of an inorganic salt, based on the weight of the fibrous material to be dyed. The fibrous material is placed in the bath with a liquor ratio of 1:50 to 1:150 and heated at 70° to 100°C for 15 to 90 minutes. When dyed, the fibrous material is taken out and treated in the same manner as above.

To the dyeing bath can be added various additives conventional in the art, such as, accelerating agents, level dyeing agents, retarding agents, etc. Examples of accelerating agents are sodium chloride, sodium sulfate, various surfactants, etc. Level dyeing agents and retarding agents are, for example, higher alcohol detergents, Turkey red oil, Marseille soap, Monopole soap, silk scouring waste, sodium carbonate, sodium pyrophosphate, etc. Further, the fibrous material dyed with the present dye can be subjected to conventional aftertreatment. For such purpose there can be used acetic acid, formaline, polyethylene, polyamines, cation surfactants, developers, metal salts. etc.

EXAMPLE 1

26.8 g (0.1 mol) of 3,3'-diamino-diphenyl tetrazine was dissolved in 60 g of concentrated hydrochloric acid and 60 g of water with heating and the resulting solution was placed into a mixture of 100 g of water and 100 g of ice. Next, to the above solution was added at 0°C a solution of 14 g (0.2 mol) of sodium nitrite in 50 g of water to tetrazotize the solution. An aqueous solution of 36.4 g (0.1 mol) of sodium 1-amino-8-naphthol-3,6-di-sulfonate was added to the tetrazotized solution, and the mixture was stirred at 0°C for 3 to 6 hours.

An aqueous solution of sodium carbonate was then added to the resulting solution to make it alkaline. To this solution was then added a diazotized solution previously prepared by dissolving 10 g of (about 0.1 mol) of aniline (aromatic amine) in 30 g of concentrated hydrochloric acid and 100 g of water and further adding 7 g (0.1 mol) of sodium nitrite at 0°C. The mixture was stirred at 0°C for 2 hours.

Subsequently, hydrochloric acid was added to the solution obtained to make it acidic. A solution of 12 g (0.12 mol) of m-phenylenediamine (aromatic compound) in 200 g of water was then added to the solution, and the mixture was stirred overnight to complete the reaction. The product obtained was filtered with suction, washed with water and then with ethyl alcohol and dried to obtain a dye, which had a structure of Dye No. 1 and was bluish black.

EXAMPLES 2 TO 9

The components listed in Table 2 below were used as aromatic amine and aromatic compound according to Example 1 to obtain various dyes in the same manner as in Example 1. The resulting dyes and their colors are listed in Table 2 below.

Table 2

| Example No. | Aromatic amine | Aromatic compound | Produced Dye (Dye No.) | Color |
|---|---|---|---|---|
| 2 | p-nitroaniline | m-phenylenediamine | 2 | black |
| 3 | aniline | m-toluylenediamine | 3 | bluish black |
| 4 | naphthylaminesulfonic acid | m-phenylenediamine | 4 | " |
| 5 | " | N'-(o-toluyl)-m-phenol | 5 | " |
| 6 | p-nitroaniline | m-toluylenediamine | 6 | " |
| 7 | aniline | phenol | 7 | green |
| 8 | sulfanilic acid | N'-(o-toluyl)-m-phenol | 8 | bluish green |
| 9 | " | m-phenylenediamine | 9 | bluish black |

EXAMPLE 10

13.0 g of a hydrochloric acid salt of aniline was dissolved in a mixture of 23 g of hydrochloric acid and 50 g of $H_2O$, and the resulting solution was diazotized with 69 g of sodium nitrite at 0°C. A neutral aqueous solution of 31.9 g of 8-amino-1-naphthol-3,6-disulfonic acid was then added to the diazotized product. The mixture was stirred overnight to effect complete coupling. $Na_2CO_3$ was dissolved in the resulting product to adjust the same to a pH of 7. Subsequently, in a mixture of 100 g of water and 56 g of 30% HCl, 26.8 g (0.1 mol) of 3,3'-diamino-diphenyltetrazine was tetrazotized at 0°C with 13.8 g of sodium nitrite. The first coupled product was treated with 20 g of $Na_2CO_3$ and was thereafter added to the tetrazotized product of 3,3'-diamino-diphenyl tetrazine which had previously been neutralized with an aqueous solution of sodium acetate. The mixture was stirred to complete coupling. To the resulting product was added a solution prepared from 100 g of $H_2O$, 17 g of $Na_2CO_3$ and 11 g of m-phenylenediamine and the mixture was stirred for 12 hours. The dye obtained was then subjected to salting out with common salt, followed by filtration and drying. The dye had the structure of Dye No. 10 and was greenish black.

EXAMPLES 11–18

Various dyes shown in Table 3 below were prepared in the same manner as in Example 1 except that 4,4'-diamino-diphenyl tetrazine was used in place of 3,3'-diamino-diphenyl tetrazine and the components listed in Table 3 were used as aromatic amine and aromatic compound. The colors of the dyes thus obtained are also shown in Table 3 below.

Table 3

| Example No. | Aromatic amine | Aromatic compound | Produced dye (Dye No.) | Color |
|---|---|---|---|---|
| 11 | aniline | m-phenylenediamine | 11 | greenish black |
| 12 | p-nitroaniline | " | 12 | " |
| 13 | aniline | m-toluylenediamine | 13 | " |
| 14 | p-nitroaniline | " | 14 | " |
| 15 | aniline | phenol | 15 | green |
| 16 | sulfanilic acid | N'-(o-toluyl)-m-phenol | 16 | reddish black |
| 17 | " | m-phenylenediamine | 17 | " |
| 18 | naphthylaminesulfonic acid | " | 18 | " |

EXAMPLE 19

A dye was prepared in the same manner as in Example 10 except that 4,4'-diamino-diphenyl tetrazine was used in place of 3,3'-diamino-diphenyl tetrazine. The resulting dye was black and had a structure of Dye No. 19.

What we claim is:

1. A polyazo dye represented by the formula

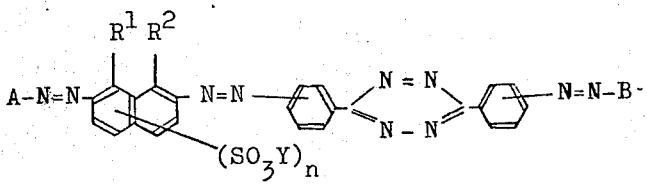

wherein A is phenyl, naphthyl or phenyl or naphthyl substituted with chlorine, lower alkyl, lower alkoxy, amino, carboxy, nitro, or SO₃H; B is

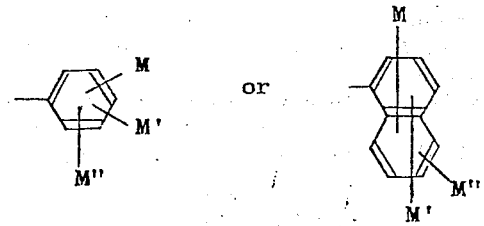

where M is NH₂ or OH; M' and M'' are the same or different and are H, NO₂, lower alkyl, SO₃H or N(R⁶)₂, the members R⁶ being independently H, NO₂, lower alkyl or phenyl substituted with lower alkyl; Y is hydrogen, alkali metal, or NH₄; $n$ is 1 or 2; and each of R¹ and R² is hydroxyl or amino, R¹ being amino when R² is hydroxyl and hydroxyl when R² is amino.

2. The dye of claim 1 wherein said A is

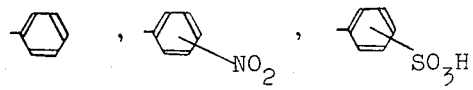

or 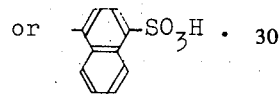

3. The dye of claim 1 wherein B is

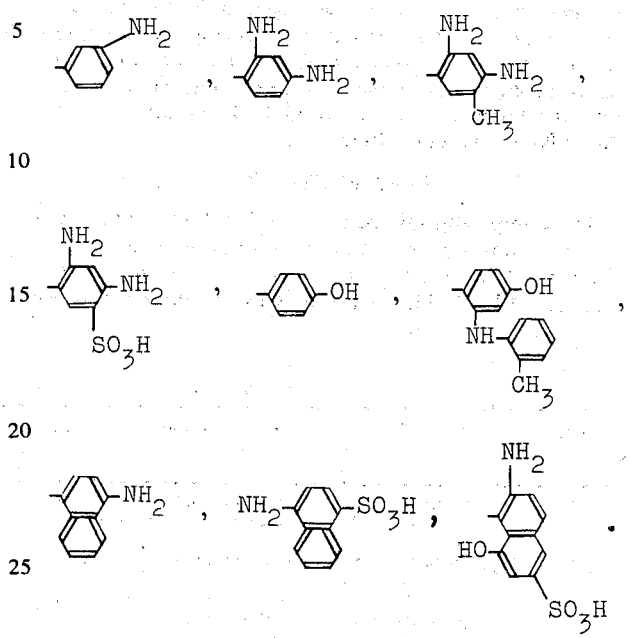

* * * * *